(12) United States Patent
Mathonet et al.

(10) Patent No.: US 9,186,935 B2
(45) Date of Patent: Nov. 17, 2015

(54) COMMERCIAL TRUCK STEER TIRE TREAD

(75) Inventors: Vincent Benoit Mathonet, Habay la Neuve (BE); Philippe Joseph Auguste Muller, Champlon (BE); Laurent Luigi Domenico Colantonio, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 236 days.

(21) Appl. No.: 13/231,472

(22) Filed: Sep. 13, 2011

(65) Prior Publication Data

US 2013/0061993 A1     Mar. 14, 2013

(51) Int. Cl.
*B60C 11/13*     (2006.01)
*B60C 11/04*     (2006.01)
*B60C 11/12*     (2006.01)

(52) U.S. Cl.
CPC ............ *B60C 11/042* (2013.04); *B60C 11/125* (2013.04); *B60C 11/1369* (2013.04); *B60C 2011/1338* (2013.04)

(58) Field of Classification Search
CPC ................ B60C 11/042; B60C 2011/1338
USPC ............. 152/209.17, 209.18, 209.21, 901, 152/DIG. 3
See application file for complete search history.

(56) References Cited

U.S. PATENT DOCUMENTS 2,121,871  A  *  6/1938  Havens ................ 152/209.21
2,696,863  A  *  12/1954  Ewart et al. ........... 152/209.21
4,703,787  A     11/1987  Ghilardi .................... 152/209
4,703,788  A     11/1987  Kusube et al. .......... 152/209 R
D396,676  S      8/1998  Croyle ....................... D12/147
5,795,415  A  *  8/1998  Campana et al. ...... 152/209.18
2005/0230020 A1* 10/2005  Miyake ................. 152/209.19
2009/0301622 A1* 12/2009  Brown .................. 152/209.19

FOREIGN PATENT DOCUMENTS

CN      1958314       5/2007
EP       206227      12/1986    ............. B60C 11/10
EP       242487      10/1987    ............. B60C 11/06
JP       63-25107     2/1988    ............. B60C 11/06

(Continued)

OTHER PUBLICATIONS

Machine translation for Japan 08-150812 (no date).*
Machine translation for Japan 06-024212 (no date).*

(Continued)

*Primary Examiner* — Steven D Maki
(74) *Attorney, Agent, or Firm* — Richard B. O'Planick (57) ABSTRACT

A vehicle tire tread includes a circumferential spaced apart array of discrete tie-bar block elements within a circumferential tread groove, each tie-bar block element having a circumferentially oriented bisecting cut dividing the tie bar into opposed tie-bar components. The opposed tie-bar components operatively flex and converge axially when present within a rolling tire footprint to close the radially outward cut segment and resume a nominal separation dimension when outside a rolling tire footprint. The bisecting cut within each tie-bar block element further forms at a radially inward end a large diameter fluid conducting channel extending through the tie-bar block element to allow the passage of fluid along the circumferential groove, unobstructed by the array of tie-bar block elements.

15 Claims, 6 Drawing Sheets

(56) References Cited

FOREIGN PATENT DOCUMENTS

| | | | | | |
|---|---|---|---|---|---|
| JP | 05-155203 | A | * | 6/1993 | |
| JP | 06-024212 | A | * | 2/1994 | |
| JP | 08-150812 | A | * | 6/1996 | |
| JP | 2002-219909 | | | 8/2002 | ............... B60C 11/04 |
| JP | 2002-219909 | A | * | 8/2002 | |

OTHER PUBLICATIONS

Machine translation for Japan 05-155203 (no date).*
Machine translation for Japan 2002-219909 (no date).*
European Search Report received by Applicants Jan. 2, 2013.
Chinese Search Report received by Applicants Aug. 11, 2014.
Japanese Translation for JP2002-219909.

* cited by examiner

COMMERCIAL TRUCK STEER TIRE TREAD

FIELD OF THE INVENTION

The invention relates generally to vehicle tires and, more specifically, to a tread pattern for steer tires intended for commercial truck application.

BACKGROUND OF THE INVENTION

Commercial truck steer tires are required to provide a suitable level of wet and snow performance while rolling resistance performance and fuel mileage efficiency achieved by the tire is maintained. Moreover, it is desired that such tires provide a high level of cornering stiffness and resistance to tread wear in order to prolong the useful life of the tire tread. Accordingly, there is a need for a commercial truck steer tire having a tread pattern that functionally meets such competing objectives to thereby provide the user with acceptable overall tire performance.

SUMMARY OF THE INVENTION

According to an aspect of the invention, a vehicle tire includes a tire tread having a circumferential tread center rib and one or more laterally adjacent intermediate ribs adjacent the center rib, each intermediate rib being separated from the center rib by a circumferential tread groove. A circumferential array of discrete tie-bar block elements is disposed within the tread groove, with adjacent tie-bar elements within the circumferential first array separated by a circumferential spacing distance. Each tie-bar block element has a circumferentially oriented bisecting cut extending into an upper surface of the tie-bar block element toward a bottom end of the block element, the bisecting cut extending in a circumferential direction through the tie-bar block element to form opposed tie-bar components. The bisecting cut divides each tie-bar block element into opposed tie-bar components which operatively flex and converge axially when present within a rolling tire footprint to operatively close the radially outward cut segment and resume a nominal separation dimension when outside a rolling tire footprint.

In another aspect, the bisecting cut within each tie-bar block element forms at a radially inward end a fluid conducting channel extending through the tie-bar block element, the channel having a nominal channel width dimension greater than the nominal width dimension of the radially outward cut segment of the bisecting cut.

The invention, in yet another aspect, deploys multiple circumferential arrays of tie-bar block elements so constructed within circumferential grooves on opposite sides of the center rib.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

With initial reference to FIGS. 1, 2, 3, and 4, a tire 10 is provided having a circumferential tread region 12. The tread 12 includes a circumferential center rib 22, two circumferential shoulder ribs 14, 16, and a pair of intermediate circumferential ribs 18, 20 disposed on opposite sides of the center rib 22. An equatorial centerplane CL divides the tread 12 into two symmetrical halves. A pair of circumferential intermediate grooves 28, 30 bound the center rib 22 and separate rib 22 form laterally adjacent intermediate ribs 18, 20, respectively. A pair of circumferential shoulder grooves 24, 26 separate respectively the intermediate ribs 18, 20 from shoulder ribs 14, 16.

Figure 1:
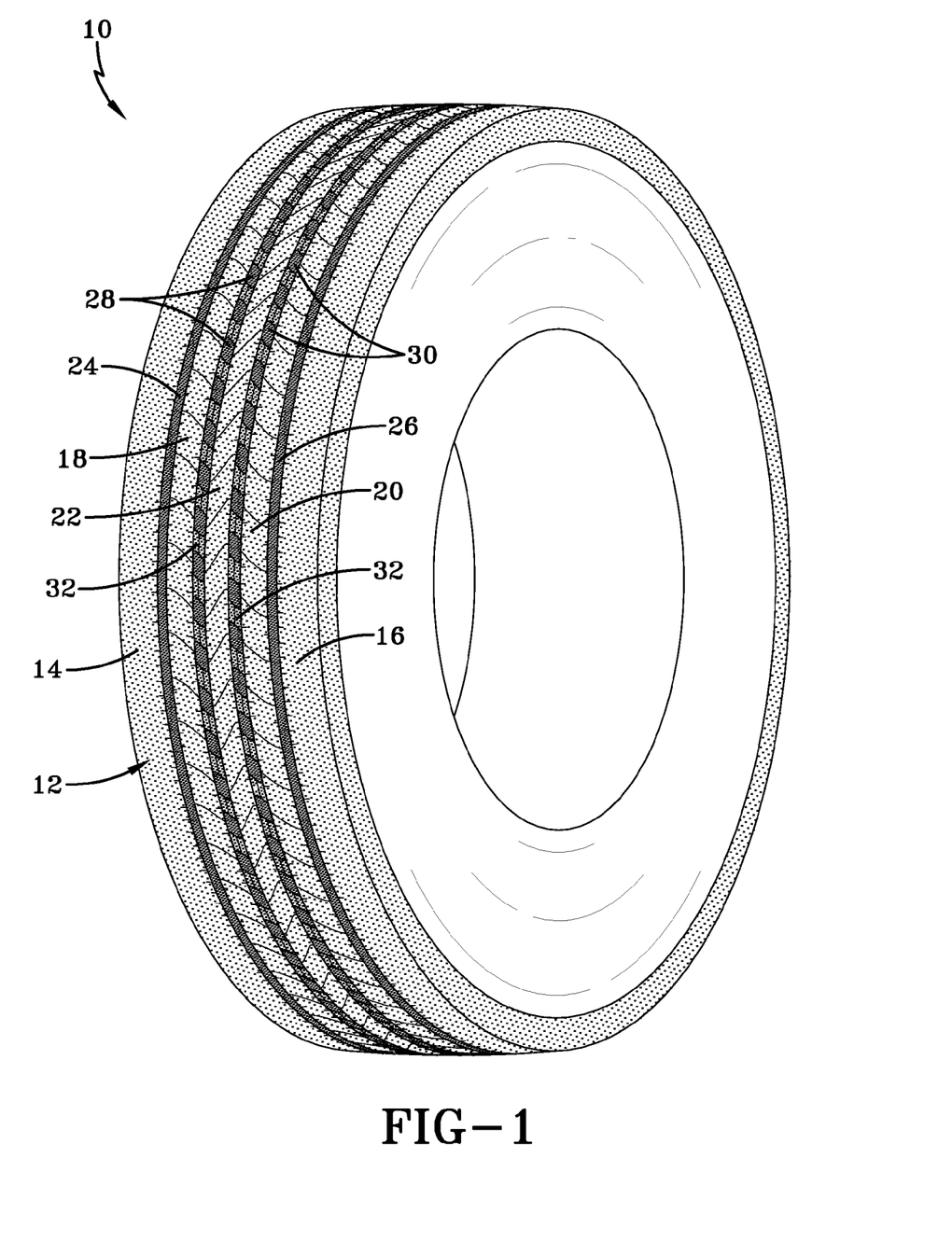
FIG. 1 is a isometric view of a tire including a tire tread.
Figure 2:
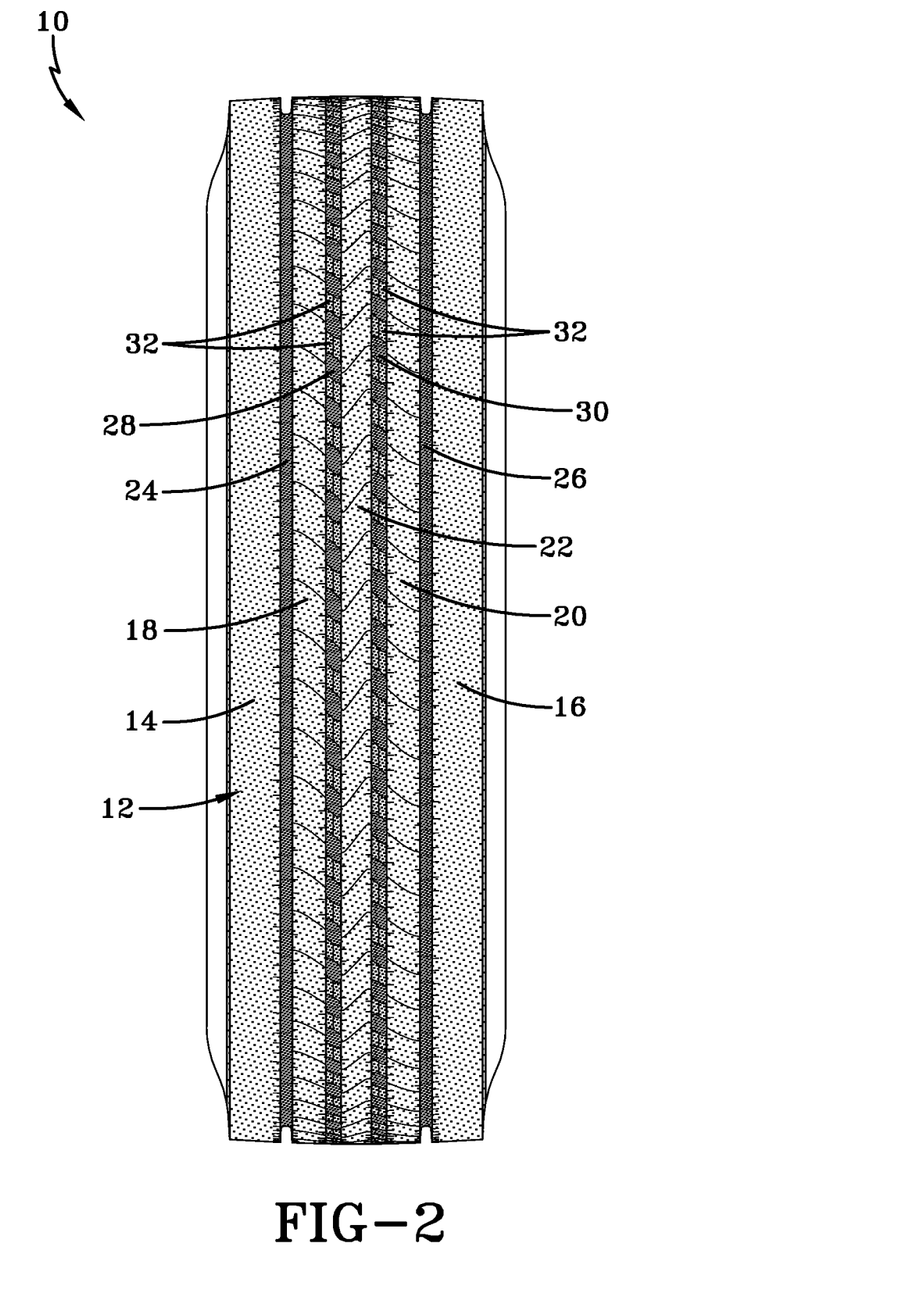
FIG. 2 is a plan view of the tire tread.
Figure 3:
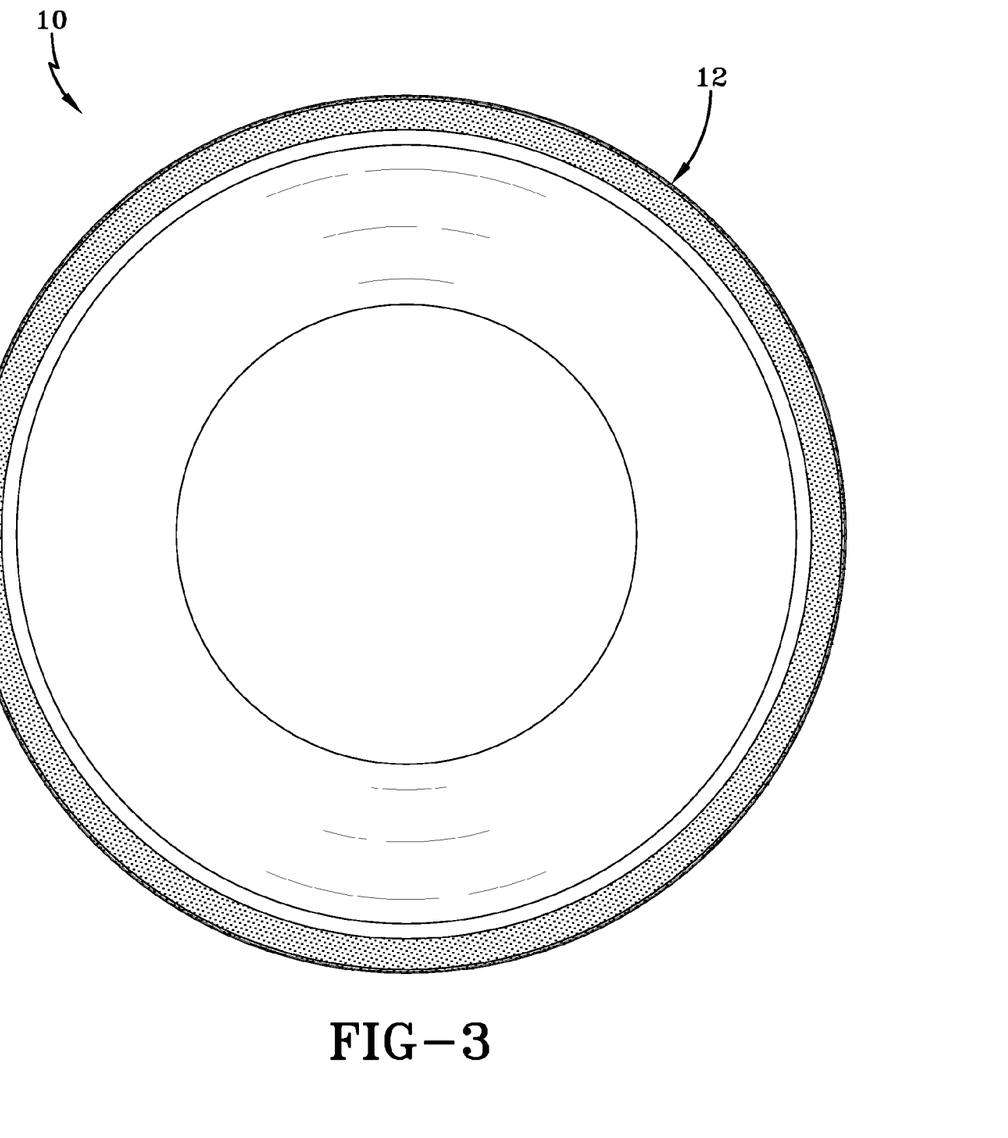
FIG. 3 is a side elevation view of the tire and tread.
Figure 4:
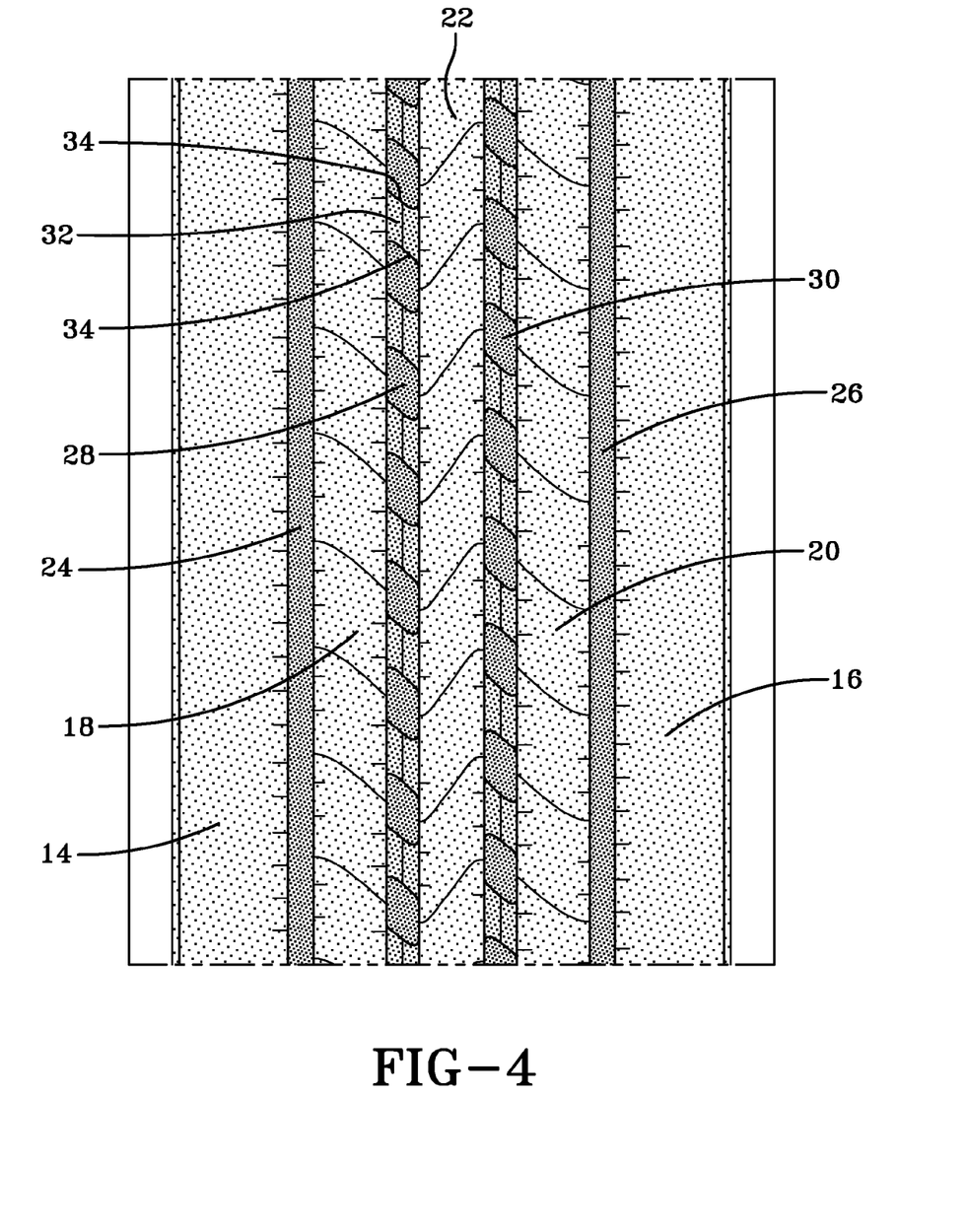
FIG. 4 is an enlarged plan view of a tread portion.
Figure 5:
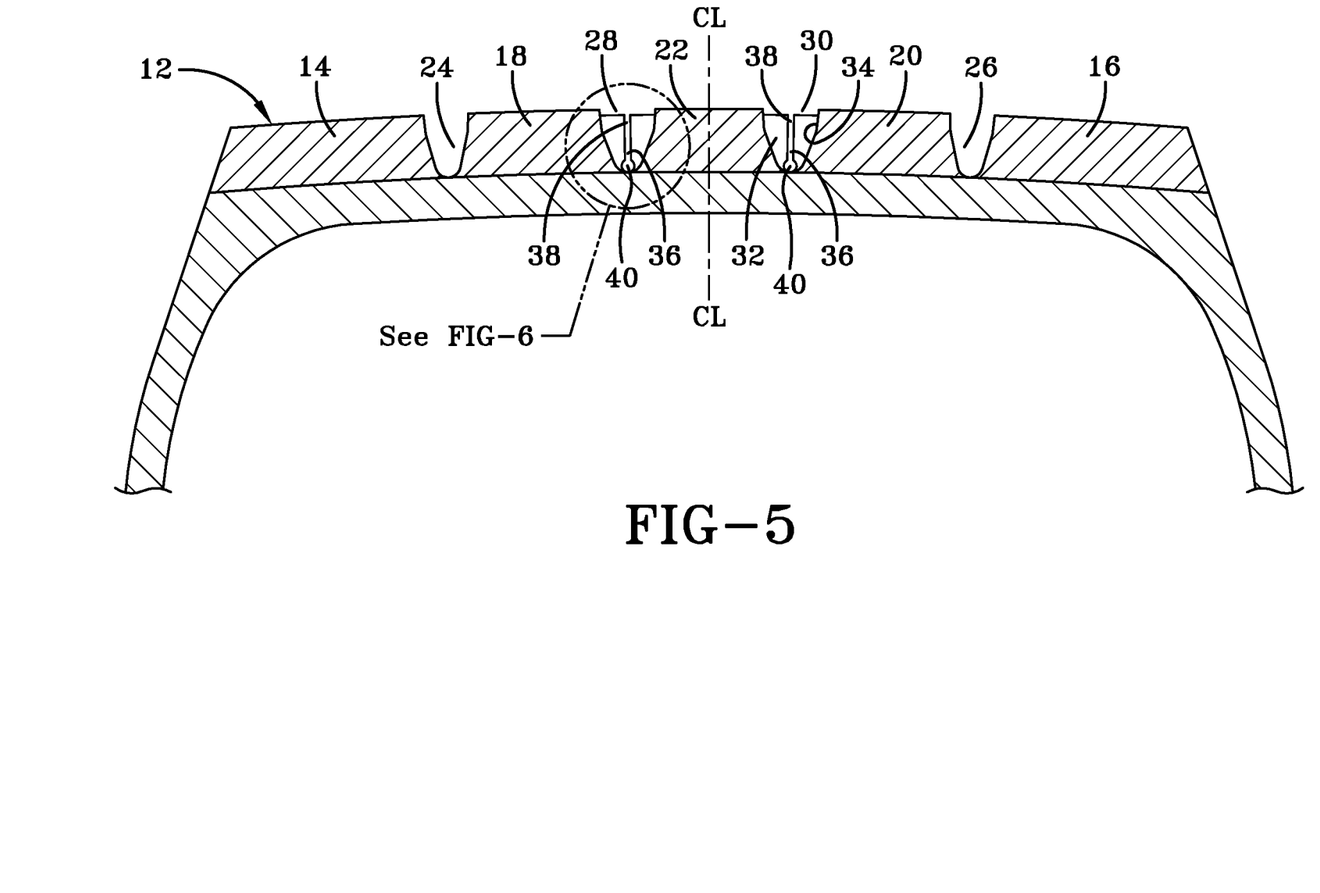
FIG. 5 is a section view through the tire tread region.
Figure 6:
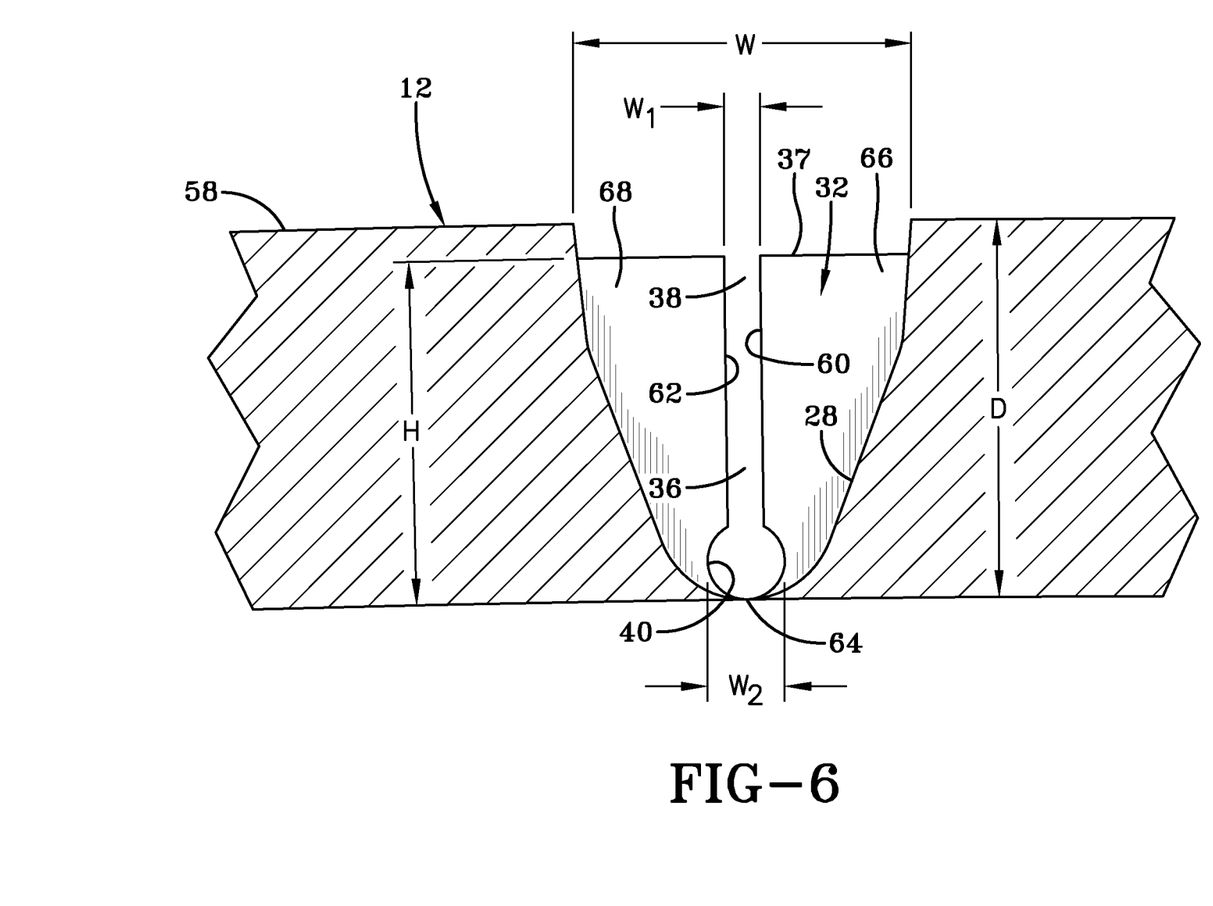
FIG. 6 is an enlarged section view of a tread region identified in FIG. 5

In the symmetrical pattern of the tread 12 shown, situated within each of the intermediate grooves 18, 20 is a circumferential array of discrete, spaced apart tie-bar block elements 32. Each of the tie bar block elements 32, as best seen from FIGS. 4, 5, 6, is generally quadrilateral and elongate in a circumferential direction, bounded along longitudinal sides by a respective intermediate rib 18, 20 and the center rib 22, and along transverse sides by concave curvilinear sides 34 that extend between a respective intermediate rib 18, 20 and the center rib 14. The tie-bar block elements 32 within each circumferential array are spaced apart by a spacing lying within a preferred range of 15 mm to 45 mm. Situated within each of the tie-bar block elements 32 is an elongate circumferentially oriented tie-bar blade cut 36. As used herein, "cut" is used in a general sense as a dividing separation and not as a reference to the manner of forming the divide. Each tie-bar cut divides a respective tie-bar block element into a pair of opposed tie-bar components 66, 68. Each of the tie-bar cuts 36 is formed having an upper cut region or segment 38 extending into an upper tie-bar surface 37 to a lower tie-bar cut region or channel 40 disposed at the base of the cut. The upper cut segment 38 is defined between generally parallel opposed cut sidewalls 60, 62. The lower cut channel 40 is generally circular in section, dimensioned having a diametric width W2 within a preferred range of 2 mm to 4 mm, and lies at the base of the tie-bar block element. The channel 40 extends circumferentially through the tie-bar block element and provides a conduit for snow and rain management as will be explained.

As will be noted from FIG. 6, the tie-bar cuts 36 are recessed radially inward from a radially outward tread surface 58. The grooves 28, 30 in which the tie-bars are recessed taper inwardly from a width dimension W such that each tie-bar block element 32 recessed within a respective groove has a width less than the W width of the groove. The tie-bars 32 thus are dimensioned at a radially outward end less than the width of the intermediate groove 28, 30 in which the block element resides. The width of the intermediate grooves W is within a preferred range of 9 mm to 15 mm. The cut 36 within each tie-bar block element has within the upper region 38 a width spacing W1 within a preferred range of 0.5 mm to 1.5 mm. The width W1 of the spacing is preselected to enable the tie-bar block element to close within a rolling tire footprint as will be explained. The intermediate groove and tie-bar block elements therein narrow from radially inward to a base region end 64. The circumferential channel 40 extending through the base of each tie-bar block element is located at end 64.

It will be appreciated that the grooves 28, 30 have a width W at a radially outward tread surface 58 and a groove depth D lying within a preferred range of 12 mm to 18 mm. The tie-bar block elements 32 are recessed within a respective groove 28, 30 and have a block element height H lying within a preferred range of 11 mm to 17 mm. Alternatively, if desired, the tie-bar elements 32 may be constructed as the same height as the outer tread surface. Thus, in the new condition, the upper surface 37 of each tie-bar block element 32 does not constitute a part of the rolling tire footprint. After sufficient wear of the tread has occurred, the surface 37 of each block element 32 is exposed and becomes part of the rolling tire footprint.

Operation of the tire tread in a rolling tire environment, and in particular the function of the slotted tie-block elements 32, will be understood from a collective consideration of FIGS. 4, 5, and 6. The tire 10 and tread 12 has application in a wide range of vehicle uses and types, and, in particular can is well suited for high mileage steer tires used in commercial trucks. Steer as well as drive locations on a commercial truck may use the subject tread configuration. In a typical application, such as in regional haul commercial trucks, the subject tread affords capacity to resist chip and chunk phenomena caused by severe road conditions encountered by the tire. The tread configuration reduces shoulder wear and irregular wear due to the rib width within a five rib design. The center rib 22 and intermediate ribs 18, 20 are relatively narrow, within a preferred range of 50 to 80 percent relative to the relatively wider shoulder ribs 14, 16, having a width within a preferred range of 40 mm to 60 mm. Consequently, the cornering stiffness provided by the tread is increased and frictional energy reduced relative to five rib tires having a conventionally uniform rib design. As a result mileage increase provided by the subject tread 12 is increased.

The arrays of tie-bar block elements 32 within the center grooves 28, 30 make the tread more rigid and helps to increase the cornering stiffness and also enhances better snow and wet performance through the tire life. The tie-bar elements 32, functioning as "rigidificators", stiffen the tread for better cornering and mileage performance. The tie-bar block elements 32, recessed within respective grooves, are not in contact with a road surface when the tire is new but establish contact after the tire tread wears. As the tie-bar block elements 32 come into contact with road surface, the edges at the sides 34 become additional edges in the footprint area. The channel region 40 of each tie-bar block element constitutes an air and water conduit for directing air and water through the block elements. Allowing air to pass through the elements eliminates trapped air and thereby reduces the noise level of the tread. Also, by allowing the passage of water through the channels 40, potential aquaplaning is eliminated.

In the five rib construction of the tread region 12, the net-to-gross ratio defined as net contact area (area enclosing the pattern of the tire tread in contact with a flat surface excluding the area of grooves or other voids at a definite load and inflation) to gross contact area (area enclosing the pattern of the tire tread in contact with a flat surface including the area of grooves or other voids at a definite load and inflation) is increased. The addition of the tie-bar block elements 32 increases the Kyy (lateral stiffness) of the tread without impacting the Kxx (circumferential stiffness) of the tread. The blade cuts 36 extend through the block elements 32 from the top surface to the bottom 64 and bisect the block in half into opposite block components in the circumferential direction. The tie-bar is thus nominally open by the spacing dimension W1 when the tie-bar is out of the rolling tire footprint.

When the tie-bar block element 32 enters the footprint of the rolling tire, the blade cut 36 closes in the axial direction, bringing the two component parts of the tie-bar together in touching relationship. As a result, the Kyy (lateral stiffness) of the tread within the footprint is increased when the tie-bar is within the footprint, whereby cornering stiffness is enhanced and frictional energy reduced. When a tie-bar leaves the footprint of the rolling tire, the tie-bar separates in the axial direction and blade cut 36 is re-opened to original spacing W1. The tie-bar block elements 32 thus help improve mileage performance of the tire by enhancing stiffness and reducing treadwear from lateral loads on the tread. The wider shoulder rib configuration further reduces the shoulder wear phenomena. As the tread wears through use, the tie-bar block elements 32 become road contacting elements and the edges defining the tie-bars additional contacting edges for enhanced traction.

It will be appreciated that the nominal width W1 of the blade cut 36 is preselected to facilitate the closing of the cut 36 when within a rolling tire footprint and opening of the cut 36 when outside the footprint. The D, H, W, W2, and W1 dimensions given herein as preferred ranges may thus be modified to other dimensions outside the identified range to suit the particular tread pattern and material composition of the tread without departing from the scope of the invention.

From the foregoing, it will be appreciated that the vehicle tire tread 12 is durable and provides improved performance characteristics. The tire tread 12, configured having one or more circumferential spaced apart arrays of discrete tie-bar block elements 32 within respective circumferential tread grooves 28, 30, alter the stiffness characteristics of the tire tread without compromising the wear and circumferential resistance characteristics of the tread. Each tie-bar block element 32 has a circumferentially oriented bisecting cut 36 which divides the tie bar into opposed tie-bar components 66, 68. The opposed tie-bar components 66, 68 accordingly operatively flex and converge axially when present within a rolling tire footprint to close the radially outward cut segment 38. The tie-bar when present within the rolling tire footprint thus stiffens the overall tread and thereby enhances cornering, wear, and handling performance of the tire tread. The opposed tie-bar components 66, 68 resume a nominal separation dimension when outside a rolling tire footprint. The bisecting cut 36 within each tie-bar block element 32 further forms at a radially inward end the large diameter fluid-conducting channel 40 which extends through the tie-bar block element to allow the passage of fluid along the circumferential groove in which the tie-bar block element is situated. The array of tie-bar block elements accordingly do not obstruct the functional performance of the groove in which the block elements are situated, and fluid such as rain or snow melt is able to traverse the circumferential groove unobstructed by the array of tie-bar block elements. The tire tread thereby provides high mileage and durability desired by the user.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A vehicle tire comprising:
  a tire tread having a circumferential center tread region comprising at least a circumferential tread center rib and a laterally adjacent intermediate rib adjacent the center rib, the intermediate rib being separated from the center rib by a circumferential tread groove;
  at least one tie-bar block element disposed within the circumferential tread groove, the one tie-bar element having a reduced height relative to a height of the center and intermediate ribs;
  the one tie-bar element comprising a quadrilateral body elongate in a circumferential direction and having terminal end surfaces circumferentially spaced apart and spanning the circumferential tread groove between the tread center rib and the adjacent intermediate rib; the one tie-bar element having longitudinal sides continuously bounded by the tread center rib and the adjacent intermediate rib from an upper surface of the tie-bar element to a bottom of the tie-bar element located at the bottom of the circumferential tread groove;
  the one tie-bar block element having a circumferentially oriented bisecting cut extending into the upper surface of the one tie-bar block element toward the bottom of the one tie-bar block element, the bisecting cut extending circumferentially through the tie-bar block element with the bisecting cut bounded by opposite inward facing cut sides; and
  wherein the circumferential tread groove has a nominal depth dimension lying within a range of 12 mm to 18 mm and the at least one tie-bar block element has a radial height within the circumferential groove lying within a range of 11 mm to less than 18 mm.

2. The tire of claim 1, wherein a circumferential first array of a first plurality of discrete tie-bar block elements is disposed within the tread groove, with adjacent tie-bar block elements within the circumferential first array separated by a circumferential spacing.

3. The tire of claim 2, wherein a circumferential second array of a second plurality of discrete tie-bar block elements is disposed within a second circumferential groove bounding an opposite side of the center rib, the tie-bar block elements within the first and the second circumferential array separated by a circumferential spacing.

4. The tire of claim 2, wherein each discrete tie-bar block element within the first array is divided by a circumferentially oriented bisecting cut extending into an upper surface of each of the first plurality of discrete tie-bar block elements, each bisecting cut extending circumferentially through a respective tie-bar block element and each bisecting cut having a radially outward cut segment bounded by opposite parallel and inward facing cut sides.

5. The tire of claim 4, wherein the bisecting cut within each of the discrete tie-bar block elements within the first array includes a radially lower channel, the channel extending through a respective tie-bar block element and having a nominal width dimension greater than a nominal width dimension between the inward facing cut sides of the radially outward segment of the bisecting cut.

6. The tire of claim 5, wherein the nominal width dimension between the inward facing cut sides of the radially upper segment of each bisecting cut lies within a range of 0.5 mm to 1.5 mm.

7. The tire of claim 6, wherein the nominal width dimension of the lower channel of each bisecting cut lies within a range of 1 mm to 4 mm.

8. The tire of claim 5, wherein a radially outward surface of each tie-bar block element is planar and radially offset and recessed a constant depth from a radially outward surface of the center rib.

9. The tire of claim 2, wherein each tie-bar block element within the first array is divided into opposed tie-bar components by the circumferentially oriented bisecting cut, the bisecting cut extending into an upper surface of the one tie-bar block element bounded along a radially outward cut segment by opposite inward facing cut sides.

10. The tire of claim 9, wherein the opposed tie-bar components operatively flex and converge axially from a nominal separation dimension into a deformed orientation when present within a rolling tire footprint to operatively close the radially outward cut segment and the opposed tie-bar components operatively flex and diverge axially into a non-deformed orientation when outside a rolling tire footprint and resume the nominal separation dimension.

11. The tire of claim 10, wherein the nominal separation dimension between the tie-bar components lies within a range of 2 mm to 6 mm.

12. The tire of claim 10, wherein the bisecting cut within each tie-bar block element forms at a radially inward end a channel extending through the tie-bar block element, the channel having a nominal channel width dimension greater than the nominal width dimension of the radially outward cut segment of the bisecting cut.

13. The tire of claim 12, wherein the nominal width dimension of the channel of the bisecting cut lies within a range of 1 mm to 5 mm.

14. The tire of claim 1, wherein the terminal end surfaces of the quadrilateral body forming the tie-bar block element extend at an incline between the tread center rib and the adjacent intermediate rib to operatively become angled contacting edges within a rolling tire footprint.

15. A vehicle tire comprising:
- a tire tread having a circumferential center tread region comprising at least a circumferential tread center rib and a laterally adjacent intermediate rib adjacent the center rib, the intermediate rib being separated from the center rib by a circumferential tread groove;
- at least one tie-bar block element disposed within the circumferential tread groove, the one tie-bar element having a reduced height relative to a height of the center and intermediate ribs;
- the one tie-bar element comprising a quadrilateral body elongate in a circumferential direction and having terminal end surfaces circumferentially spaced apart and spanning the circumferential tread groove between the tread center rib and the adjacent intermediate rib; the one tie-bar element having longitudinal sides continuously bounded by the tread center rib and the adjacent intermediate rib from an upper surface of the tie-bar element to a bottom of the tie-bar element located at the bottom of the circumferential tread groove; and
- the one tie-bar block element having a circumferentially oriented bisecting cut extending into the upper surface of the one tie-bar block element toward the bottom of the one tie-bar block element, the bisecting cut extending circumferentially through the tie-bar block element with the bisecting cut bounded by opposite inward facing cut sides;
- wherein a circumferential first array of a first plurality of discrete tie-bar block elements is disposed within the tread groove, with adjacent tie-bar block elements within the circumferential first array separated by a circumferential spacing;
- wherein each discrete tie-bar block element within the first array is divided by a circumferentially oriented bisecting cut extending into an upper surface of each of the first plurality of discrete tie-bar block elements, each bisecting cut extending circumferentially through a respective tie-bar block element and each bisecting cut having a radially outward cut segment bounded by opposite parallel and inward facing cut sides;
- wherein the bisecting cut within each of the discrete tie-bar block elements within the first array includes a radially lower channel, the channel extending through a respective tie-bar block element and having a nominal width dimension greater than a nominal width dimension between the inward facing cut sides of the radially outward segment of the bisecting cut;
- wherein a radially outward surface of each tie-bar block element is radially offset and recessed from a radially outward surface of the center rib; and
- wherein the first circumferential groove has a nominal depth dimension lying within a range of 12 mm to 18 mm and each tie-bar block element has a radial height within the circumferential groove lying within a range of 11 mm to less than 18 mm.

\* \* \* \* \*